United States Patent [19]
Xaver et al.

[11] 4,271,936
[45] Jun. 9, 1981

[54] CLOSURE FOR RETAINING AN INSERTABLE BRAKE LINING IN A BRAKE LINING HOLDER FOR DISK BRAKES

[75] Inventors: Wirth Xaver, Ismaning; Schörwerth Mathias, Geretsried, both of Fed. Rep. of Germany

[73] Assignee: Knorr-Bremse GmbH, Munich, Fed. Rep. of Germany

[21] Appl. No.: 71,285

[22] Filed: Aug. 30, 1979

[30] Foreign Application Priority Data

Sep. 21, 1978 [DE] Fed. Rep. of Germany ....... 2841139

[51] Int. Cl.³ ............................................. F16D 65/04
[52] U.S. Cl. ................................... 188/244; 188/234; 188/250 G
[58] Field of Search ............... 188/234, 235, 242, 244, 188/245, 250 G, 250 B; 24/73 SS, 81 KF, 241 P, 241.5 B, 255 SL, 270

[56] References Cited

U.S. PATENT DOCUMENTS

| | | | |
|---|---|---|---|
| 2,598,545 | 5/1972 | House | 188/234 |
| 3,653,103 | 4/1972 | Bush | 24/270 |
| 3,851,738 | 12/1974 | Gebhardt et al. | 188/234 |
| 3,874,712 | 4/1975 | Watson | 24/270 |
| 4,000,792 | 1/1977 | Guldin | 188/242 |
| 4,004,659 | 1/1977 | Rochell | 188/244 |

*Primary Examiner*—Edward R. Kazenske
*Attorney, Agent, or Firm*—Edmund M. Jaskiewicz

[57] ABSTRACT

A brake lining support member for disk brakes for railway vehicles and the like has an insertable brake lining retained in position by a locking bar at least one end of which is secured by a U-shaped spring clip having parallel legs one of which is mounted in a bracket on the brake lining holder and the other leg mounted in the locking bar.

7 Claims, 4 Drawing Figures

CLOSURE FOR RETAINING AN INSERTABLE BRAKE LINING IN A BRAKE LINING HOLDER FOR DISK BRAKES

The present invention relates to a lock for retaining a brake lining which is insertable into a brake lining support for disk brakes, more particularly, mounting of the lock on the brake lining support.

Brake shoes for the disk brakes of railway and other vehicles generally comprise a brake lining support having a lining guide in which a brake lining is insertable. A locking latch is pivotally mounted on the brake lining support in such a manner that the latch traverses the locking guide when the latch is in the locking position to retain the brake lining in the lining guide.

In U.S. Pat. No. 3,851,738 issued Dec. 3, 1974 such a brake shoe comprises a pivotally mounted locking latch and a locking projection on the latch is insertable in an opening in the brake lining support which opening is transverse to the lining guide and the brake lining. The locking projection contacts the face of the opening away from the lining guide when the latch is in the locking position. The latch is thus readily pivotable to permit removal and insertion of a brake lining.

In German Pat. No. 2,434,004 such a locking latch is mounted on the lining holder by providing a slotted hole extending perpendicularly to the face of the lining holder in each of the ends of the latch and these holes receive leaf springs which secure the mounting bolts for the locking latch in one or the other end position opposite the surface of the brake lining support in which is mounted the brake lining. This mounting has the disadvantage that the slots are easily clogged with dirt so that the pins in the slots can no longer occupy various positions and/or the spring action of the leaf springs is no longer available. There is the further disadvantage that the fabricating of such slots together with the inserted leaf springs requires substantial skill and effort since the manufacturing process is much more involved than merely providing bores or drill holes.

It is therefore the principal object of the present invention to provide a novel and improved lock for retaining a brake lining insertable into a brake lining support of a disk brake.

It is another object of the present invention to provide such a lock for retaining an insertable brake lining whose structure is simplified so as to facilitate mounting or removal of the locking bar with respect to the brake lining support.

It is a further object of the present invention to provide such a lock for an insertable brake lining wherein the locking and release of the brake lining on the brake lining support is readily and easily achieved to facilitate removal and replacement of the brake lining.

It is an additional object of the present invention to provide such a lock which is simple in structure, effective in operation, inexpensive to manufacture and install and requires a minimum of maintenance and care during operating conditions.

The objects of the present invention are achieved and the disadvantages of the prior art are overcome by the present invention wherein at least one end of the locking bar is secured by a U-shaped spring pin whose legs are supported in bores parallel to the direction of the brake lining guide and which bores are in brackets on the brake lining support and in the locking bar. When the locking bar is in the locked position the U-shaped spring clip will be stressed so as to exert a resilient force in the direction of the locked position and when the locking bar is pivoted to an unlatched position the spring clip will be swung upwardly so as to be relieved of stress.

According to one aspect of the present invention a lock for retaining a brake lining insertable into a brake lining support of a disk brake may comprise a brake lining support which is provided with a longitudinally extending brake lining guide means. A locking bar has one end pivotally mounted on the brake lining support so as to be pivotable in a plane perpendicular to the brake lining guide means and into a locking position across an open end of the brake lining guide means. The locking bar is provided with a locking latch which is positionable against a face of the opening when the locking bar is in the locking position. A U-shaped spring clip having a pair of substantially parallel legs has one leg received in a first bore formed in locking bracket means on the brake lining support and the other leg in a second bore at the other end of the locking bar. Both bores are parallel to the brake lining guide means. The spring clip is stressed to exert a force in the locking direction of the locking bar when the locking bar is in the locked position and is relieved of stress when the locking bar is pivoted from the locked position into an unlocked position.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail. Like reference symbols having a single prime indicate the parts in a first position, a double prime indicate the same parts in a second position, and a triple prime indicate the same parts in a third position.

Figure 1:
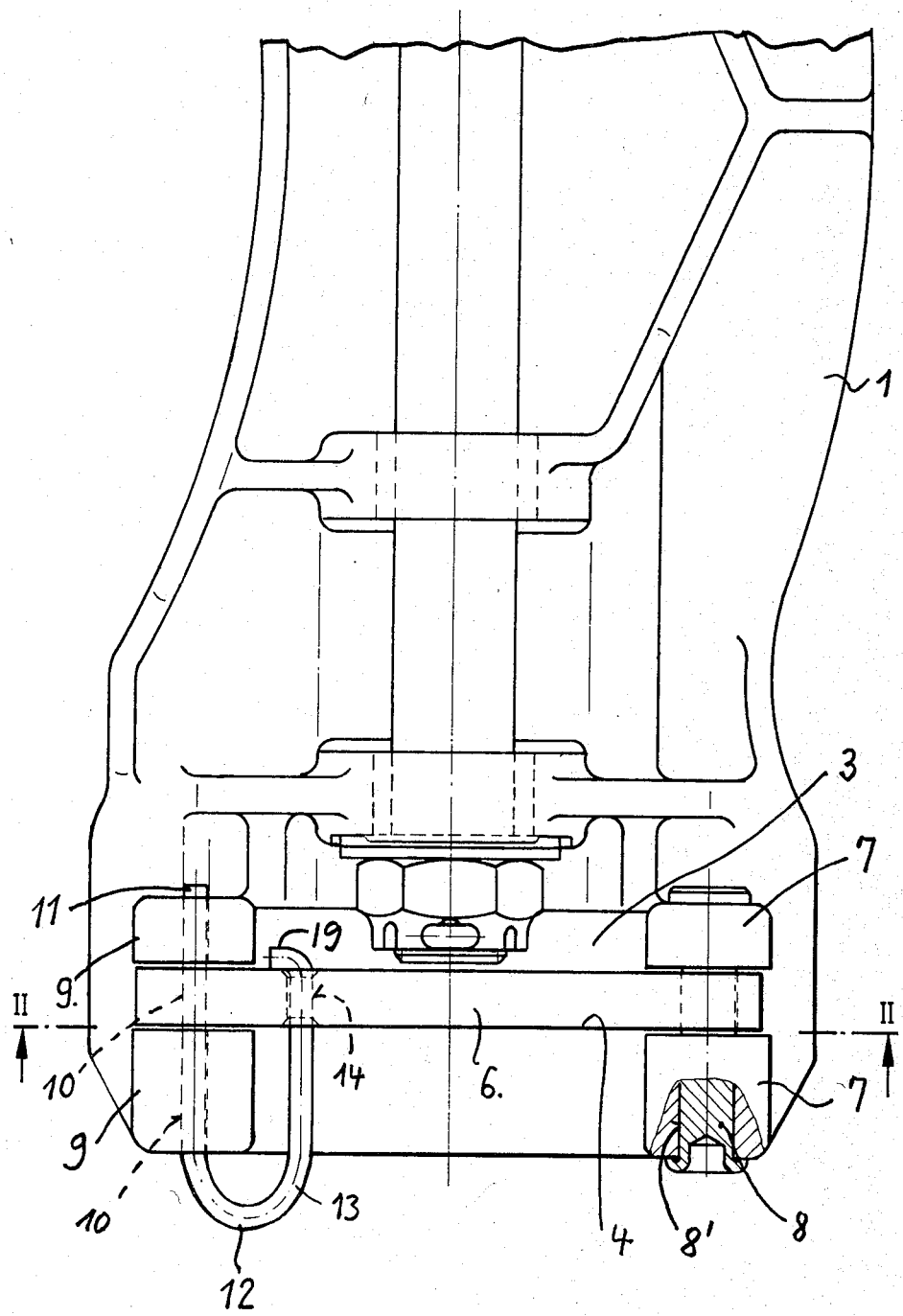
FIG. 1 is plan view of a portion of a brake shoe incorporating the lock of the present invention.
Figure 2:
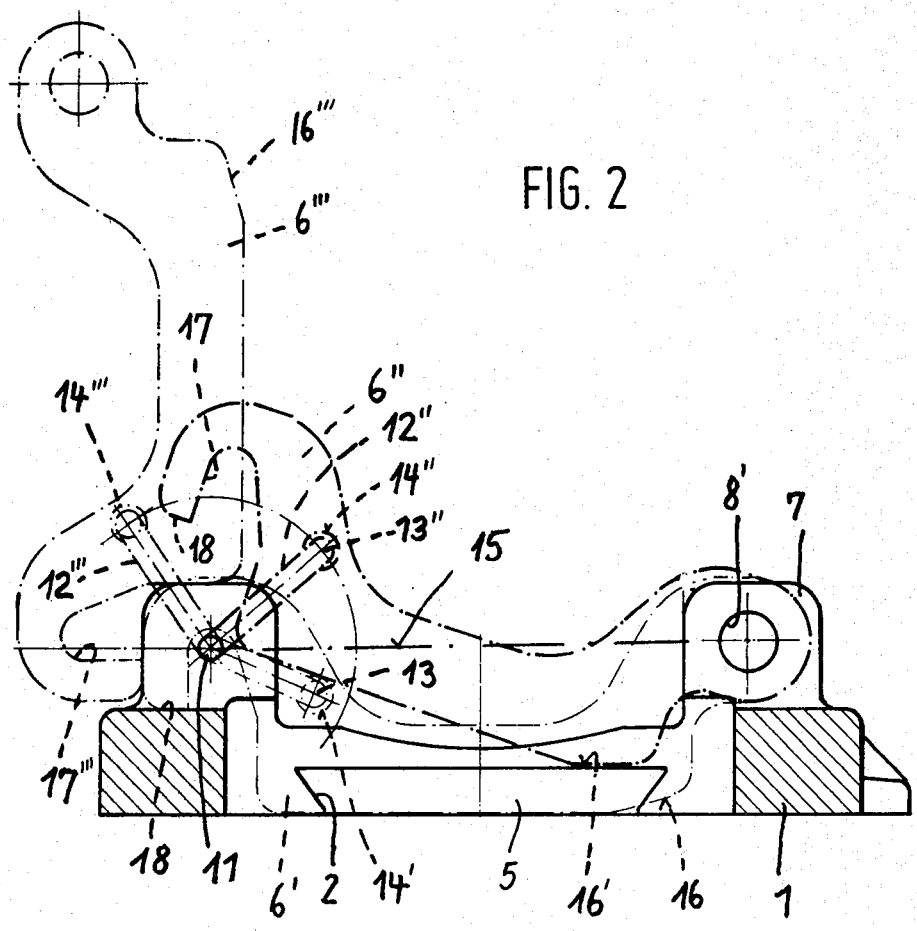
FIG. 2 is a sectional view taken along the line II—II of FIG. 1.

The brake shoe illustrated in FIGS. 1 and 2 comprises a brake lining support or carrier 1 having on its inner face or surface a dovetail-shaped slot 2 closed at its other end not shown in the drawings and forming a brake lining guide into which a brake lining is inserted and retained in position. The guide slot 2 is open in its upper end as may be seen in FIG. 2 and in the vicinity of this open end there is provided an elongated slot or opening 3 which extends transversely to the lining guide 2 and has a length which is greater than the width of the guide 2. The opening 3 has a longitudinal edge or face 4 which is adjacent the end of the brake lining support 1 and is machine-planed to a flat surface to function as a contact surface for a locking latch 5 formed on the side of a locking bar 6 which is directed toward the brake lining support 1. One end of the locking bar 6 is pivotally mounted between two mounting brackets 7 provided on the upper surface of the lining support 1 and about a pivot pin 8 received in bores 8' in the mounting brackets 7 which bores are parallel to the lining guide 2.

The locking latch 5 is constructed as a narrow, elongated attachment whose shape and configuration can best be seen in FIG. 2. As can be seen in the locked position of locking bar 6 the locking latch 5 is disposed in the opening 3 in the lining guide 2 and closes or blocks this opening so as to retain a brake lining within the guide slot 2.

The slotted opening 3 has a length which is at least approximately equal to the width of the lining guide 2 and preferably greater than this width. The locking latch 5 has a length which is approximately equal to the length of the slot 3 but is preferably slightly shorter than the slot 3 as shown in FIG. 2. The locking latch 5 extends in the plane of pivoting of the latch on that side of the latch which faces the lining support. The locking latch 5 may also have a substantially trapezoidal shape in which case the length of the locking latch 5 could be slightly longer than the length as shown in FIG. 2.

In order that the locking bar 6 may have limited axial displacement with respect to its pivot pin 8, the distance between the mounting lugs or brackets 7 is approximately equal to the thickness of the locking bar 6 as may be seen in FIG. 1.

In order to secure the locking bar 6 in the locked position as indicated at 6' in FIG. 2, the free end of the locking bar which is the end remote from the pivot pin 8 engages between two locking brackets or lugs 9 on the upper surface of the brake lining support 1 as can be seen in FIG. 1. The locking brackets 9 are provided with aligned bores 10 which are parallel to the lining guide 2. The bores 10 receive a substantially straight leg 11 of a U-shaped shackle or pin 12 constructed of spring steel and having a second leg 13 which is received within a bore 14 in the locking bar 6. In the locked position of the locking bar 6, the bore 14 is in the position as indicated at 14' in FIG. 2 and this position is below a line 15 which passes through the axes of the bores 10 and the bores 8' perpendicular thereto. The position of the bore 14' can also be described as being on that side of the line 15 which is in the locking direction of the locking bar 6.

In the locked position 6', the distance between the bores 10 and 14 in which are inserted both legs of the U-shaped clip 12 is shorter that when the locking bar is in the unlocked position as shown at 6" in FIG. 2. Thus, the U-shaped pin 12 is stressed in the locked position of the locking bar by a pressing together of its substantially parallel legs 11 and 13 in proportion to the decrease of the distance between the bores 10 and 14 in the locked and unlocked position of the locking bar. In the locked position 6' of the locking bar the spring clip 12 thus exerts a resilient force or moment upon the locking bar 6 in the direction of the locked position.

The locking bar 6 can be raised from its locked position 6' to its unlocked position 6" by inserting a tool such as a screwdriver under the free end of the locking bar opposite pin 8 in such a way that the bore 14 is moved out of its position 14' above the Zero-line 15. As soon as the bore 14 is moved above the Zero-line 15 as shown in FIG. 2, the spring action of the clip 12 will snap the locking bar 6 into its unlocked position as shown at 6".

In a converse manner, if the locking bar 6 is in its unlocked position 6", the free end of the locking bar can be pushed in the direction of the locking position to snap the locking bar into its locked position under the spring action of the pin 12 as soon as the bore 14 has been pushed below the Zero-line 15 as shown in FIG. 2.

In its locked position 6", the locking latch 5 closes the lining guide 2 so as to retain the brake lining in the guide and to prevent the brake lining from being removed.

In order to assure that the locking bar 6 in its unlocked position 6" completely unblocks the dove-tailed guide 2 so as to permit access to the brake lining, the lower edge 16 of the locking latch toward the pin 8 is beveled or cut off as shown in FIG. 2. It is thus apparent from FIG. 2 that when the locking bar is in the unlocked position 6" the locking latch will not impede access to the brake lining in the guide 2 and the brake lining can be readily removed and another lining inserted.

The free end of the locking bar 6 remote from the pin 8 is provided with a hook-shaped recess 17 which in the closed or locked position of the locking bar encloses or fits around the leg 11 of the pin 12 but without contacting or touching the leg 11. In its locked position, the locking bar 6 is supported by a front surface 18 on the tip portion of the hook 17 which front surface rests upon the upper face of the lining support 1 between the two locking brackets 9.

In order that the U-shaped pin 12 does not inadvertently or unintentionally become disengaged from the bores 10 and 14 and thereby release the locking bar 6, leg 13 has a hook-shaped offset 19 on its free end so that this offset engages behind the locking bar 6 as shown in FIG. 1. The other leg 11 of the spring clip 12 is substantially straight in its passage through the bores 10. Since the locking bar in its locked position 6' and its unlocked position 6" still has a portion of its free end positioned between the locking brackets 9, the U-shaped pin 12 will be firmly retained in the bores 10 and 14.

In order disassemble the locking bar 6 from the brake shoe, the pivot pin 8 is first removed so as to release or disengage the pivot end of the locking bar. The locking bar can then be pivoted about the axis of the leg 11 of the spring clip 12 into the position 6'''. In the disassembled position 6''', the hook-shaped portion 17 of the locking bar 6 becomes completely free of the locking brackets as can be seen in FIG. 2 so that the locking bar in its upright position 6''' can be moved in an axial direction outwardly of the brake lining support 1 whereupon the leg 11 of spring pin 12 is released from the bore 10. Conversely, in a reversed sequence, the locking bar 6 can be mounted on the brake lining support 1.

Figure 4:
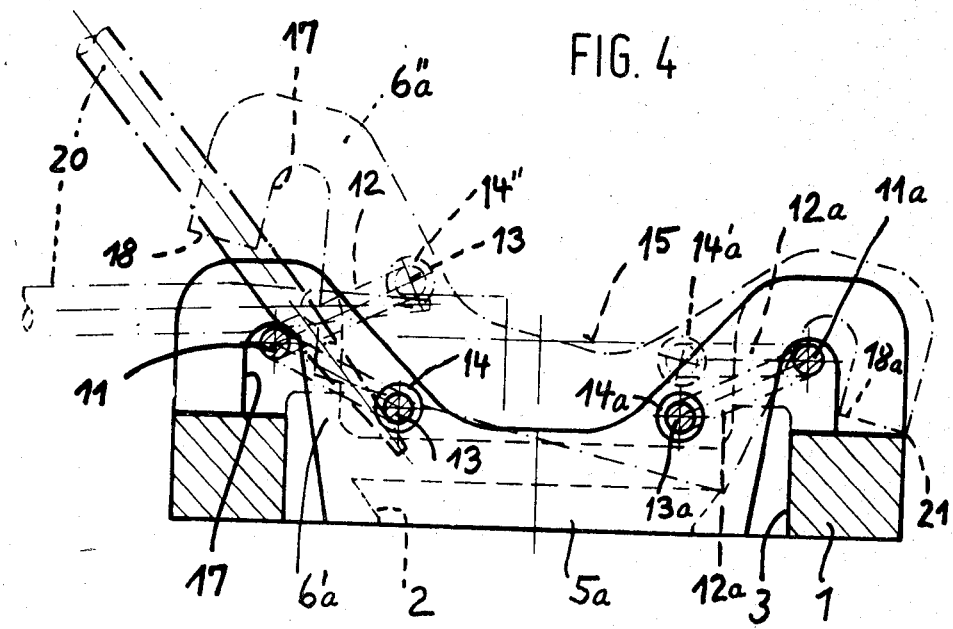
FIG. 4 is a sectional view taken along the line IV—IV of FIG. 3.
Figure 3:
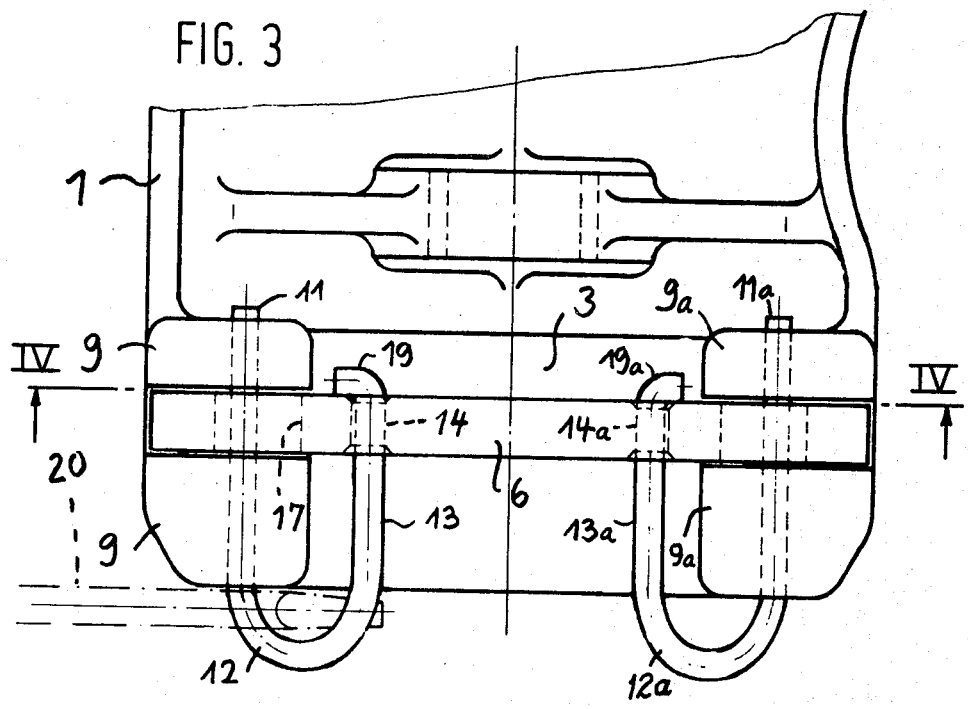
FIG. 3 is a view similar to that of FIG. 1 and showing a modification of the lock of the present invention.

In the modification as illustrated in FIGS. 3 and 4, both ends of the locking bar 6 are mounted by respective U-shaped spring clips on the brake lining support 1. Locking bar 6a in FIGS. 3 and 4 is thus constructed symmetrically as can be seen in FIG. 4. If the left end of the locking bar 6a as viewed in FIGS. 3 and 4, is swung upwardly with a screwdriver or similar tool as indicated at 20 from its locked position 6a' into its unlocked position 6a", the locking bar 6a will rotate around its outermost edge 21 of the opposed right end that is supported between locking brackets 9a on the upper surface of the brake lining support 1. As result of this pivoting movement of the locking bar 6a, the leg 13a of clip 12a will remain engaged in the bore 14a at the right end of the locking bar 6a and the leg 13a will remain below the Zero-line 15 so that the right end of the locking bar 6a will not snap out of position.

The locking latch 5a of locking bar 6a as viewed in FIG. 4, is substantially of a trapezoidal shape since the locking latch 5a in a direction perpendicular to the lining guide 2 is longer in length than the corresponding dimension of latch 5 in FIGS. 1 and 2. The trapezoidal shape of latch 5a facilitates pivoting of the locking bar 6a out of the slot opening 3 in the brake lining support 1.

The locking latch 5a can also be made rectangular in shape but this shape of the locking latch would tend to weaken the strength of the locking bar 6a in its upper portions adjacent the hook recesses 17. This weakening can be compensated by a reinforcing construction of the ends of the locking structure.

In order to assemble the locking bar 6a upon the the brake lining support 1, one or any of the two U-shaped pins 12 and 12a is mounted similarly to the assembly of locking bar 6 of FIGS. 1 and 2, but the offset portion 19 on the other pin is formed only after this pin has been assembled.

In order to disassemble or remove the locking bar 6a, one of the two U-shaped spring pins 12 and 12a must be broken or its offset end removed, to permit the locking bar 6a to be disassembled in a manner similar to the disassembly of locking bar 6 of FIGS. 1 and 2.

Locking latch 5a of locking bar 6a of FIGS. 3 and 4 can also be provided with cut away or beveled edges 16 which are preferably formed at both ends of the locking latch, since the locking bar 6a can be pivoted up to an unlocked position by pivoting upwardly either of its two ends.

The cut away portion 16 can be eliminated if the locking bar 6a is moved into its unlocked position by snapping up successively both of its ends, since snapping up only one of its ends will not completely unblock the brake lining guide 2.

In the structures of FIGS. 1, 2 and of 3,4 it is preferable that the spring pins 12 be undetachably secured to the brake lining support 1 so that the assembled locking bar cannot be accidentally lost.

Thus it can be seen that the present invention has disclosed a lock for a brake lining in a brake lining support of a disk brake which is simple in structure and effective in operation. The lock can be readily moved to an unlocking position to permit assembly or disassembly of the brake lining or can be moved to a further disassembly or upright position to enable the entire locking bar to be removed from the brake lining support member. Maintenance of the locking bar is also facilitated and proper functioning of the locking bar will not be hindered by dirt and foreign bodies, since the structure of the locking bar prevents the accumulation of such matter.

It will be understood that this invention is susceptible to modification in order to adapt it to different usages and conditions and, accordingly, it is desired to comprehend such modification within this invention as may fall within the scope of the appended claims.

What is claimed is:

1. In a lock for retaining a brake lining insertable into a brake lining support of a disk brake, brake lining support means including longitudinally extending brake lining guide means having an open end, a locking bar having first and second ends, mounting bracket means on said brake lining support means and a pin through said first end of said locking bar parallel to said brake lining guide means and received in said mounting bracket means, said locking bar being pivotable in a plane perpendicular to said brake lining guide means and into a locking position across the open end of said brake lining guide means, a locking latch on said locking bar and positionable against a face of said opening when the locking bar is in the locking position, locking bracket means on said brake lining support means and having a first bore therethrough parallel to said brake lining guide means, there being a second bore at the second end of said locking bar parallel to said brake lining guide means and between said first bore and said first end of the locking bar, a U-shaped spring clip having a pair of substantially parallel legs with one of said legs being receivable in said first bore and the other of said legs being receivable in said second bore, said second bore at the second end of said locking bar being positioned on a locking direction side of a line extending perpendicularly between the axes of said first bore and said pin when said locking bar is in the locking position, the distance between said first and second bores when the locking bar is in the locked position being less than said distance when the locking bar is in its unlocked position such that said spring clip is stressed to exert a force in the locking direction of the locking bar when the locking bar is in the locking position and is relieved of stress when the locking bar is pivoted into the unlocking position.

2. In a lock as claimed in claim 1 and further comprising a hook on said second end of said locking bar defining a recess, said recess receiving the leg of said spring clip received in said first bore of said locking bracket means when the locking bar is in the locked position, said hook having a tip portion resting on a surface of said brake lining support means opposed from said brake lining guide means when the locking bar is in the locked position.

3. In a lock as claimed in claim 2 wherein said locking bracket means comprises a pair of spaced locking brackets and at least a portion of said hook of said locking bar being disposed between said locking brackets when said locking bar is in an unlocked position.

4. In a lock as claimed in claim 3 wherein the leg of said spring clip within said second bore in said locking bar has a bent end and the other leg of said spring clip is straight, said locking bar being pivotable about said straight leg of said spring clip when said pin is removed to disengage said locking bar first end from said mounting bracket means to enable said hook of said locking bar to be positioned outwardly of said locking brackets so as to permit assembly and disassembly of said spring clip and said locking bar.

5. In a lock as claimed in claim 2 and further comprising a second hook on said first end of said locking bar defining a second recess, said mounting bracket means on said brake lining support means having a third bore therethrough parallel to said brake lining guide means, said pin comprising a second U-shaped spring clip having a pair of substantially parallel legs and one of said legs being receivable in said third bore and the other of said legs being receivable in a fourth bore in the first end of said locking bar, pivoting one of said first and second ends of said locking bar from the locking position will enable said locking bar to pivot about a said hook on the other of said first and second ends of said locking bar and the bore in said locking bar closer to the other end thereof will remain positioned on a locking direction side of a line extending between said first and third bores such that said second U-shaped spring clip at the other end of said locking bar exerts a force in the locking direction of the locking bar.

6. In a lock as claimed in claim 5 wherein said locking bar pivots about an outermost end of said hook on said other of said first and second ends of said locking bar.

7. In a lock as claimed in claim 1 wherein one end of said locking latch is cut away to provide access to the brake lining guide means when said locking bar is in the unlocked position.

* * * * *